(No Model.)

S. A. CUNNINGHAM.
MUFF.

No. 266,105. Patented Oct. 17, 1882.

WITNESSES
F. H. Knight
Harry Bernhard

INVENTOR
Sarah A. Cunningham
By Edson Bro's
Attorneys

UNITED STATES PATENT OFFICE.

SARAH A. CUNNINGHAM, OF NEW YORK, N. Y.

MUFF.

SPECIFICATION forming part of Letters Patent No. 266,105, dated October 17, 1882.

Application filed May 13, 1882. (No model.)

*To all whom it may concern:*

Be it known that I, SARAH A. CUNNINGHAM, (late Mrs. Sarah A. Moody,) a citizen of the United States, residing at New York, in the county of New York and State of New York, have invented certain new and useful Improvements in Muffs, of which the following is a specification, reference being had therein to the accompanying drawings, and in which—

Figure 1:
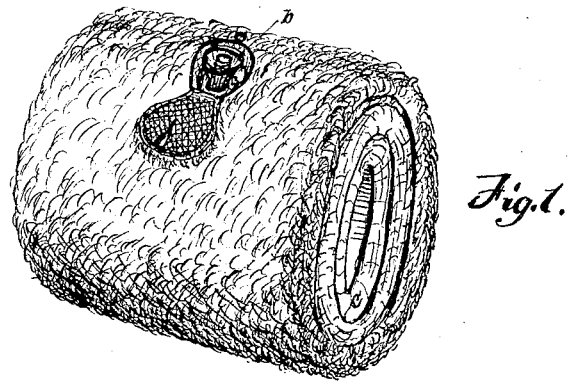
Figure 2:
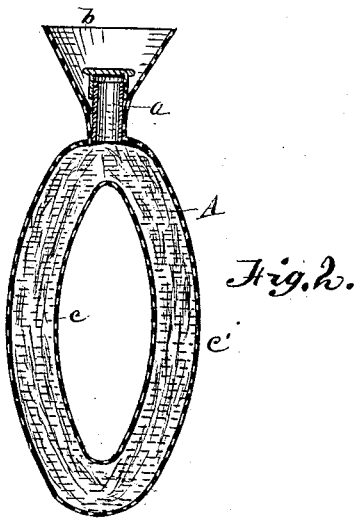

Figure 1 is a perspective view of my invention. Fig. 2 is a sectional view of the same.

This invention has relation to interlining for muffs, capable of holding hot water for keeping the hands warm and other purposes.

This muff has an inner chamber, A, made of any material adapted to carry hot water—viz., tin or any sheet metal, vulcanized rubber, gutta-percha, rubber cloth, or other material. Rubber fabric is preferably and generally used. Located on one side of the chamber or receptacle A is a tube, $a$, (shown in the sectional view,) and when the receptacle or chamber is made of rubber cloth or other fabric I have secured to the receptacle and around the tube or nozzle a funnel-shaped part, $b$, through which the receptacle may be conveniently filled. The chamber or receptacle A has an inner wall, $c$, and an outer wall, $c'$, which are continuations of each other, providing, in addition to a chamber for holding the water, an opening and chamber for the reception of the hands. These walls may be elliptical, circular, or of other form.

I am aware that a rubber bag for holding water, variously made, is not new, and I do not claim such as my invention.

The nozzle or tube is fitted with a screw-cap or a cork for keeping it water-tight after filling the receptacle.

The muff, when finished in any desired style and combined with my interlining, is generally made with a flap flexibly connected thereto to conceal from view the tube or nozzle and funnel of the receptacle. This flap, as well as the muff itself, may be finished with any fur, plush, velvet, or other material in any desired style. The flap being turned back, the water is put into the receptacle in a heated state, and said water retaining the heat for a considerable time and heating the receptacle of the muff, the hands will be kept comfortably warm in the coldest weather by its use.

In traveling this interlining for muffs may be placed between or under the feet, and will keep them warm also; or it may be used generally as a hot-water bag.

I claim and desire to secure by Letters Patent—

1. As a new article of manufacture, an interlining for muffs, consisting of the receptacle A, adapted to hold heated water or other liquid, provided with a hand-opening, and having a funnel, within which is arranged a filling-tube, as set forth.

2. The combination, with the receptacle A, having the filling-tube and funnel arranged, as described, in the center of the outer wall of a finished muff, of an inclosing flap or cover, substantially as set forth.

In testimony whereof I affix my signature in presence of two witnesses.

SARAH A. CUNNINGHAM.

Witnesses:
JOS. R. EDSON,
HARRY BERNHARD.